(12) United States Patent
Yamazaki

(10) Patent No.: US 11,001,458 B2
(45) Date of Patent: May 11, 2021

(54) PRODUCT TAKING-OUT APPARATUS, PRODUCT CARRYING-OUT APPARATUS, AND PRODUCT TAKING-OUT METHOD

(71) Applicant: AMADA CO., LTD., Kanagawa (JP)

(72) Inventor: Hiroyuki Yamazaki, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 0 days.

(21) Appl. No.: 16/761,585

(22) PCT Filed: Nov. 8, 2018

(86) PCT No.: PCT/JP2018/041440
§ 371 (c)(1),
(2) Date: May 5, 2020

(87) PCT Pub. No.: WO2019/093408
PCT Pub. Date: May 16, 2019

(65) Prior Publication Data
US 2020/0270075 A1    Aug. 27, 2020

(30) Foreign Application Priority Data
Nov. 9, 2017 (JP) .............................. JP2017-216316

(51) Int. Cl.
*B65G 61/00* (2006.01)
*B21D 43/00* (2006.01)
*B23K 26/38* (2014.01)

(52) U.S. Cl.
CPC ........... *B65G 61/00* (2013.01); *B21D 43/003* (2013.01); *B23K 26/38* (2013.01); *B65G 2203/047* (2013.01)

(58) Field of Classification Search
CPC .............. B65G 61/00; B65G 2203/047; B65G 2249/045; B65G 47/90; B65G 47/91;
(Continued)

(56) References Cited

U.S. PATENT DOCUMENTS 5,234,207 A * 8/1993 Lindstrom ............... B65H 3/48
271/106
5,676,364 A * 10/1997 Shiiki .................. B65H 3/0816
271/106

(Continued)

FOREIGN PATENT DOCUMENTS

CN 101264497 A 9/2008
CN 101830356 A 9/2010
(Continued)

OTHER PUBLICATIONS

International Search Report issued in International Bureau of WIPO Patent Application No. PCT/JP2018/041440, dated Dec. 11, 2018, along with an English translation thereof.
(Continued)

*Primary Examiner* — Stephen A Vu
(74) *Attorney, Agent, or Firm* — Greenblum & Bernstein, P.L.C.

(57) ABSTRACT

A product taking-out apparatus includes a suction part to suck a plate-like metal product and ascend, a touch plate to move between a separate position and a contact position with respect to the product sucked by the suction part, and a vibrator to vibrate the touch plate.

10 Claims, 11 Drawing Sheets

(58) Field of Classification Search
CPC .. B65G 47/92; B65G 2249/04; B65G 49/064;
B65G 49/067; B65G 2201/022; B65G
49/061; B65G 49/06; B65G 49/07; B65G
2201/025; B65G 47/252; B65G 47/914;
B65G 47/918; B65G 59/068; B21D
43/003; B21D 28/10; B21D 28/12; B21D
43/00; B21D 43/10; B21D 43/18; B21D
43/22; B21D 43/282; B21D 43/287;
B21D 45/00; B21D 45/04; B21D 11/02;
B21D 11/20; B21D 22/06; B21D 25/02;
B21D 37/02; B21D 53/92; B21D 5/00;
B21D 5/006; B23K 26/38; B23K
2201/40; B23K 26/1405; B23K 26/1458;
B23K 26/147; B23K 26/16; B23K 37/00;
B25J 15/06; B25J 15/0608; B25J
15/0616; B25J 15/0658; B25J 15/0052;
B25J 11/00; B25J 9/16; H01L 21/67346;
H01L 21/677; H01L 21/67712; H01L
21/683; H01L 21/6835; H01L 21/6838;
H01L 2221/68327; B23Q 7/04; C08L
77/10; C08L 83/04; C08L 9/02; C08L
61/06; C08L 2201/08; C08L 2205/025;
C08L 2205/035; C08L 2205/16; B22F
2003/1056; B22F 2003/247; B22F 3/003;
B22F 3/004; B22F 3/03; B22F 3/1055;
B22F 3/24; B22F 7/08; A01D 46/253;
A01D 46/30
USPC .......................................... 294/65.5, 185, 188
See application file for complete search history.

(56) References Cited

U.S. PATENT DOCUMENTS

| | | | | |
|---|---|---|---|---|
| 6,438,437 B1* | 8/2002 | Yamaoka | ......... | G05B 19/41815 700/112 |
| 6,606,531 B1* | 8/2003 | Leibinger | ................ | B65H 1/00 156/364 |
| 2004/0099112 A1* | 5/2004 | Ohmiya | .............. | H01L 21/6838 83/100 |
| 2014/0199153 A1* | 7/2014 | Reinhold | ............. | B65H 3/0816 414/800 |

FOREIGN PATENT DOCUMENTS

| | | |
|---|---|---|
| CN | 104760822 A | 7/2015 |
| CN | 105313008 A | 2/2016 |
| CN | 205222063 U | 5/2016 |
| EP | 2 616 373 A1 | 7/2013 |
| JP | 64-86173 A | 7/1979 |
| JP | 59-91216 U | 6/1984 |
| JP | 6-127716 A | 5/1994 |
| JP | 2571253 Y2 | 5/1998 |
| JP | 2748424 B2 | 5/1998 |
| JP | 10-258938 A | 9/1998 |
| JP | 2862999 B2 | 3/1999 |
| JP | 2005-272118 A | 10/2005 |
| JP | 2013-184805 A | 9/2013 |
| KR | 2004-0005055 A | 1/2004 |
| WO | 94/01355 | 1/1994 |

OTHER PUBLICATIONS

Written Opinion issued in International Bureau of WIPO Patent Application No. PCT/JP2018/041440, dated Dec. 11, 2018, along with an English translation thereof.
Notice of Transfer issued in Japan Counterpart Patent Appl. No. 2017-216316, dated May 10, 2019, along with an English translation thereof.
Decision of Refusal issued in Japan Counterpart Patent Appl. No. 2017-216316, dated Feb. 12, 2019, along with an English translation thereof.
Notice of Reasons for Refusal issued in Japan Counterpart Patent Appl. No. 2017-216316, dated Nov. 29, 2018, along with an English translation thereof.
Decision to Grant a Patent issued in Japan Counterpart Patent Appl. No. 2017-216316, dated May 22, 2019, along with an English translation thereof.
Chinese Official Action issued in CN Application No. 201880072345.4, dated Dec. 2, 2020.
European Official Action issued in EP Application No. 18 87 5340, dated Dec. 18, 2020.

* cited by examiner

PRODUCT TAKING-OUT APPARATUS, PRODUCT CARRYING-OUT APPARATUS, AND PRODUCT TAKING-OUT METHOD

TECHNICAL FIELD

The present invention relates to a product taking-out apparatus, a product carrying-out apparatus, and a product taking-out method, and particularly, to a product taking-out apparatus, a product carrying-out apparatus, and a product taking-out method that separate and take out a product, which is cut out of a workpiece, from a work remainder (skeleton).

BACKGROUND ART

Japanese Unexamined Patent Application Publication No. 2005-272118 (Patent Literature 1) mentions about a separation technique of a plate material product from a workpiece remainder when punching the product through a punching process and taking out the product.

The separation technique mentioned in the Patent Literature 1 forms a combined state in which the outer shape of a product and the inner shape of a skeleton slightly mesh with each other so that frictional force prevents them from being cut away from each other, and for separation, applies a shock so that vibration by the shock separates them from each other.

SUMMARY OF INVENTION

Problems to be Solved by Invention

Separation of a product from a skeleton is performed not only in a pressing process as mentioned in the Patent Literature 1 but also similarly in a laser beam cutting process.

For example, in a process employing a laser composite processor capable of performing laser processing and punching, a product is often shaped and cut with a laser beam. The cut product is sucked by a suction device of a takeout loader and is carried to and collected at an adjacently arranged shelf or the like.

However, a cut width (kerf width) in the laser cutting process is relatively narrow so that the product during or after the process may partly get under a skeleton, or may have a distortion around a cut region due to heat caused by processing. Depending on the degree of the distortion, there happens a case that the product and skeleton slightly overlap each other in a vertical direction.

If the product comes under the skeleton, the skeleton interferes with the product when the product is sucked and lifted by the suction device of the takeout loader, thereby causing a problem to the lift and separation of the product.

The shock separation technique mentioned in the Patent Literature 1 is effective to resolve a combined state formed by friction between an outer shape and an inner shape but is ineffective to resolve the vertical overlapping of a product and skeleton.

Accordingly, there is a need for a device for satisfactorily achieving the lift and separation of a product from a skeleton when taking out the product cut out of a workpiece.

Means to Solve Problems

The present invention is able to provide a product taking-out apparatus, a product carrying-out apparatus, and a product taking-out method that are capable of satisfactorily lifting and separating a product from a skeleton.

According to a technical aspect of the present invention, the product taking-out apparatus is characterized by including a suction part that sucks a plate-like metal product and ascends, a touch plate that moves between a separate position and a contact position with respect to the product sucked by the suction part, and a vibrator that vibrates the touch plate.

According to another technical aspect, the product carrying-out apparatus is characterized by including a pallet having a support member that supports a product cut out of a plate-like metal workpiece and a skeleton, i.e., a remainder, a suction part that sucks the product supported on the support member and ascends, a touch plate that moves between a separate position and a contact position with respect to the product sucked by the suction part, a vibrator that vibrates the touch plate, and a controller that causes the suction part to suck the product supported on the support member and lift the same by a predetermined distance, and thereafter, causes the touch plate to come into contact with the product sucked by the suction part and activates the vibrator for a predetermined time.

Further, the product taking-out method is characterized by including a sucking and lifting step of causing a suction part to suck and lift a product, which is cut out of a metal plate, from a skeleton, i.e., a remainder, the product and skeleton being supported on a support member, a contacting step of causing a touch plate to come into contact with the product sucked by the suction part, and a vibration applying step of causing a vibrator to vibrate the touch plate that is in contact with the product.

MODE OF IMPLEMENTING INVENTION

Figure 1:
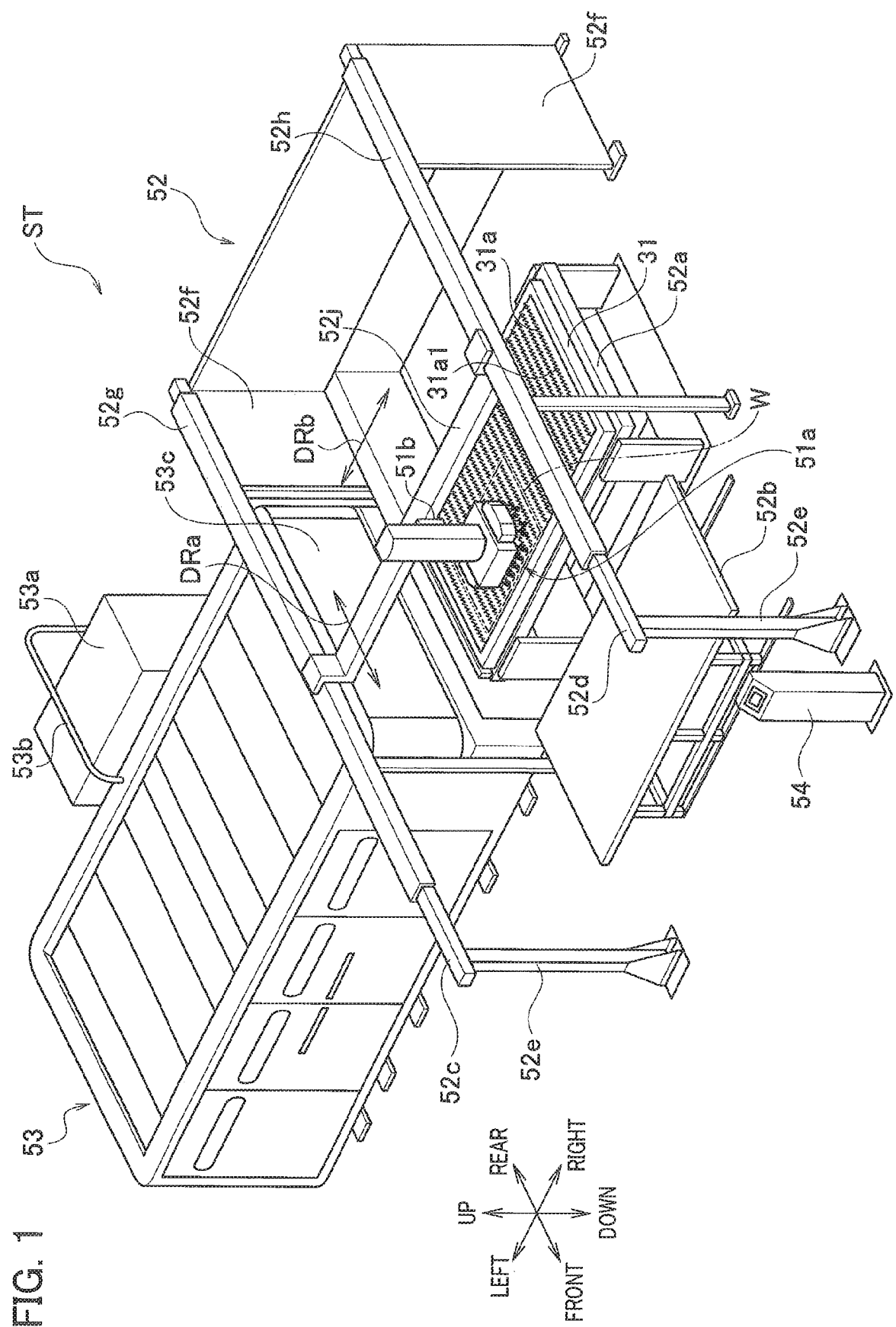
FIG. 1 is a perspective view illustrating a processing system ST including a product carrying-out apparatus 52 provided with a takeout loader 51 that is an example of a product taking-out apparatus according to an embodiment of the present invention.

A product taking-out apparatus according to an embodiment of the present invention will be explained with a takeout loader unit 51 that is an example thereof and a laser processing system ST that includes a laser processing machine 53 and a product carrying-out apparatus 52 provided with the takeout loader unit 51. Hereunder, the takeout loader unit 51 will be referred to as the TK unit 51.

Embodiment

A general structure of the laser processing system ST will be explained with reference to FIG. 1 which is a perspective view and FIG. 2 which is a block diagram. For convenience of explanation, up, down, left, right, front, and rear directions are defined as indicated with arrows in FIG. 1. An up-down direction is a vertical direction and the front is a worker standing side.

The laser processing system ST is constituted by including the laser processing machine 53, the product carrying-out apparatus 52 adjacently arranged on the left or right (right in FIG. 1) side of the laser processing machine 53, and a controller 54 for entirely controlling the system.

The laser processing machine 53 has a laser oscillator 53a and a laser processing head (not illustrated) to emit a laser beam generated by the laser oscillator 53a. The laser oscillator is, for example, a fiber laser and a laser beam generated by the laser oscillator 53a is supplied through a process fiber 53b to the laser processing head.

The laser processing machine 53 is able to move a work pallet 31 on which a workpiece W is placed in a left-right direction in the processing machine and is also able to move the laser processing head in front-rear and up-down directions. Further, the laser processing machine 53 has a pallet gate 53c to pass the work pallet 31 in and out so that the work pallet 31 as moved into and out of the laser processing machine 53 through the pallet gate 53c. In a state illustrated in FIG. 1, the work pallet 31 discharged from the laser processing machine 53 toward the product carrying-out apparatus 52 is holding thereon the workpiece W (indicated with a chain line).

In this way, the laser processing machine 53 is able to emit a laser beam from the laser processing head to an optional horizontal position (a front-rear or left-right position) on the workpiece W placed on the work pallet 31 and conduct laser processing.

The product carrying-out apparatus 52 has a pallet table 52a arranged at the adjacent right of the laser processing machine 53 at a position corresponding to the pallet gate 53c and a transfer table 52b arranged in front of and in parallel with the pallet table 52a. In FIG. 1, the work pallet 31 is illustrated in a state moved onto the pallet table 52a.

Further, the product carrying-out apparatus 52 is provided with a pair of top frames 52c and 52d supported with a plurality of support posts 52e and wall parts 52f in a state separated from each other in the left-right direction and extended in parallel with each other in the front-rear direction.

The pair of top frames 52c and 52d are arranged at positions corresponding to a width of the pallet table 52a, and within a range corresponding at least to a front-rear directional length of the pallet table 52a and transfer table 52b, are provided with rails 52g and 52h, respectively. The rails 52g and 52h support a movable frame 52j extending in the left-right direction so that the movable frame 52j is movable in the front-rear direction (an arrow DRa).

The movable frame 52j supports the TK unit 51 so that the TK unit 51 is movable in the left-right direction (an arrow DRb).

Figure 2:
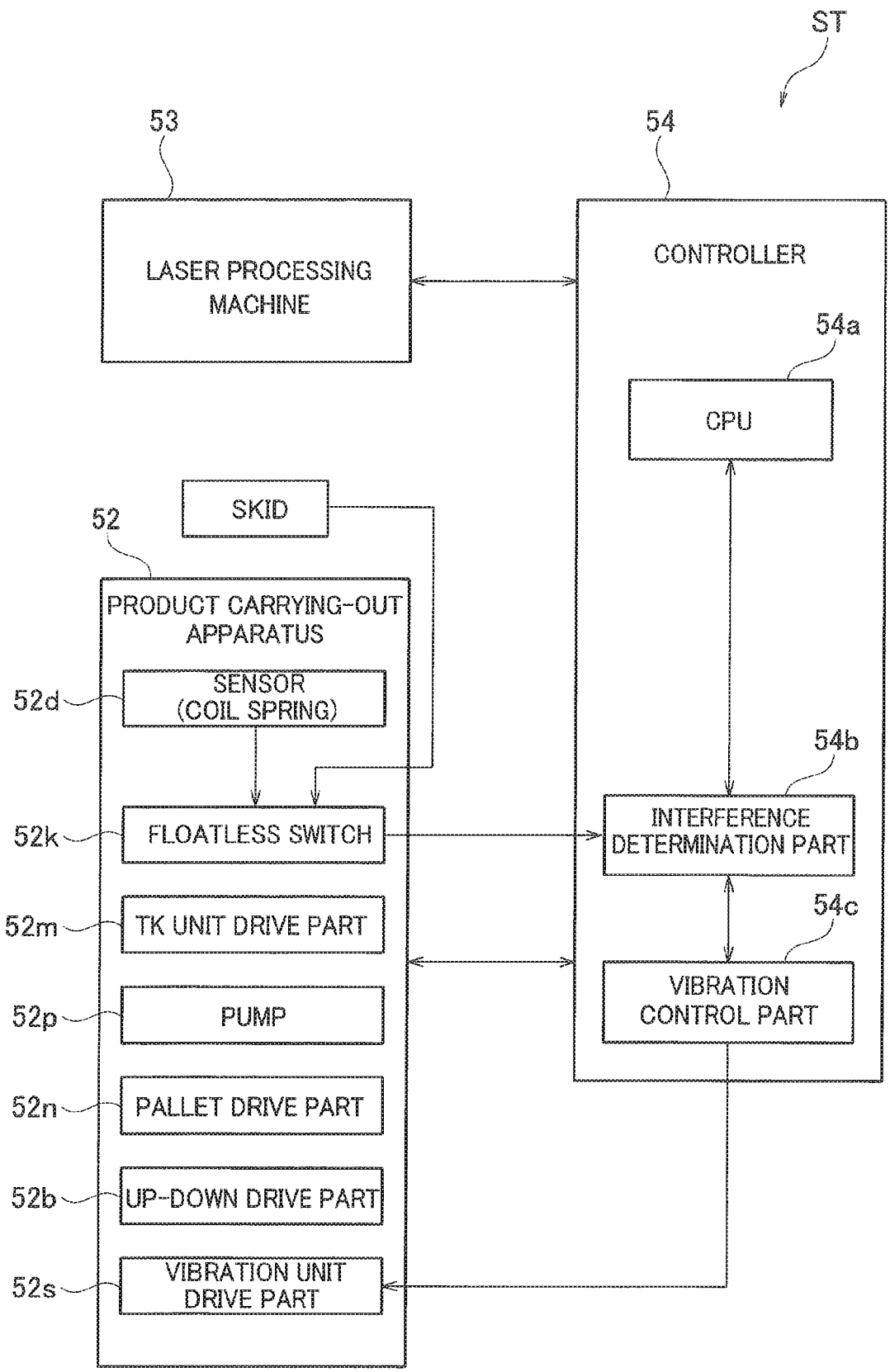
FIG. 2 is a block diagram illustrating a constitution of the processing system ST.

The product carrying-out apparatus 52 is provided with a TK unit drive part 52m and a pallet drive part 52n (refer to FIG. 2). The TK unit drive part 52m executes, under the control of the controller 54, a front-rear movement of the movable frame 52j with respect to the rails 52g and 52h and a left-right movement of the TK unit 51 with respect to the movable frame 52j.

Operation of the TK unit drive part 52m enables the TK unit 51 to move to above an optional horizontal position of the pallet table 52a and transfer table 52b.

The TK unit 51 is provided with, at a lower part thereof, a suction part 51a having a plurality of suction pads capable of sucking a plate-like member such as a product. Further, the TK unit 51 has an up-down drive unit 51b to move up and down the suction part 51a with respect to the movable frame 52j. Operation of the up-down drive unit 51b is controlled by the controller 54.

As illustrated in FIG. 2, the controller 54 is constituted by including a central processing unit (CPU) 54a, an interference determination part 54b, and a vibration control part 54c.

Figure 8:
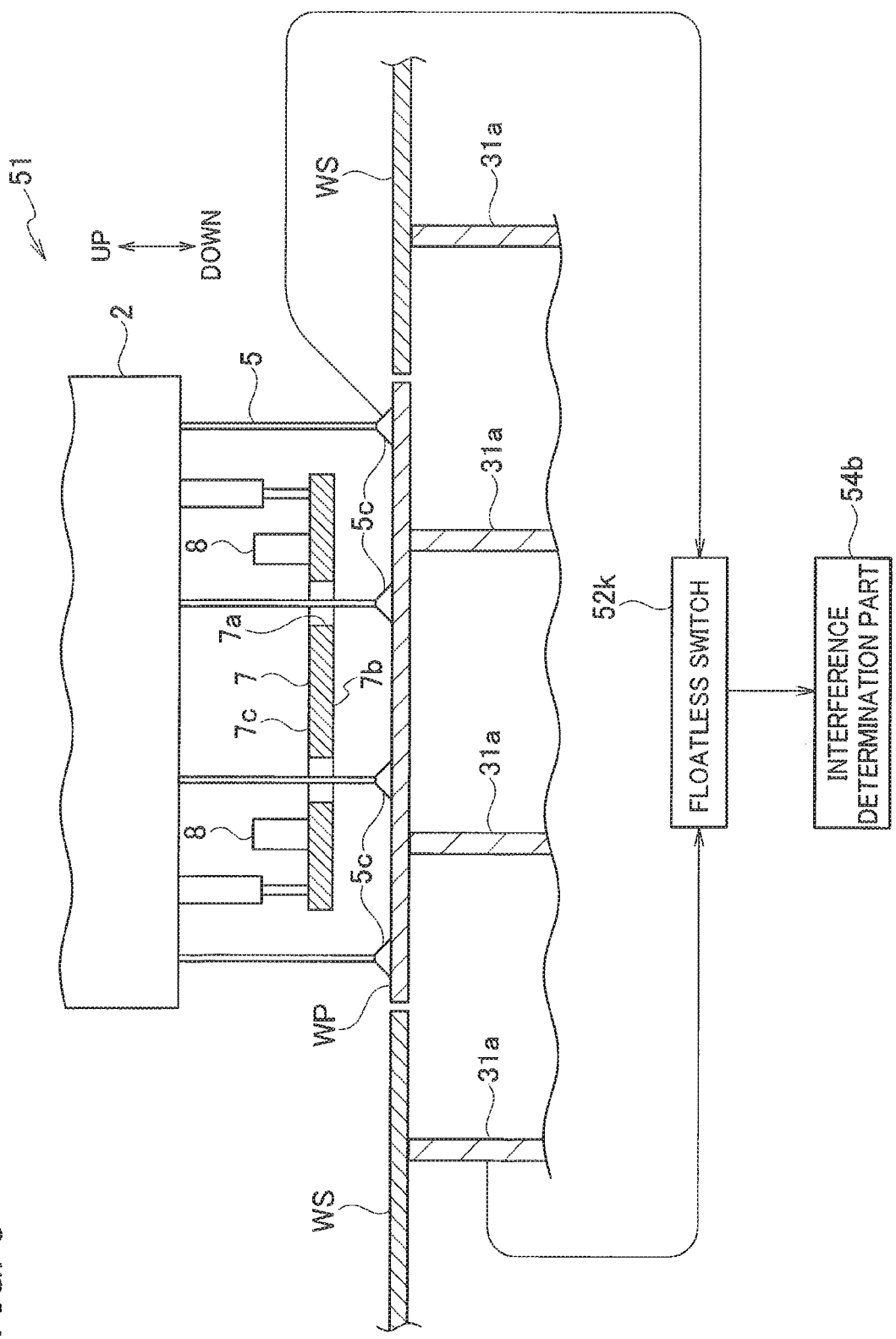
FIG. 8 is a first operational view explaining a product taking-out operation by the takeout loader 51.

With the configuration mentioned above, the product carrying-out apparatus 52 is able to move a product WP to the transfer table 52b from among the product WP and a skeleton WS, i.e., a remainder that are conveyed from the laser processing machine 53 and are on the work pallet 31 (refer to FIG. 8).

In more detail, the TK unit 51 is caused to move to a position above the product WP and descend. Next, the suction part 51a is caused to suck the product WP with the suction pad parts 5c, ascend and horizontally move to above the transfer table 52b, and descend and release suction. The product WP is consequently moved from the work pallet 31 onto the transfer table 52b.

As illustrated in FIG. 1, the work pallet 31 is a rectangular pallet on which a plurality of skids 31a are arranged in parallel with one another, the skid 31a being a metal plate having a plurality of cusp parts 31a1 that are upwardly pointed. The workpiece W placed on the work pallet 31 is supported with a plurality of the cusp parts 31a1. The plurality of skids 31a are electrically parallel-connected to a floatless switch 52k (refer to FIG. 2).

Figure 3:
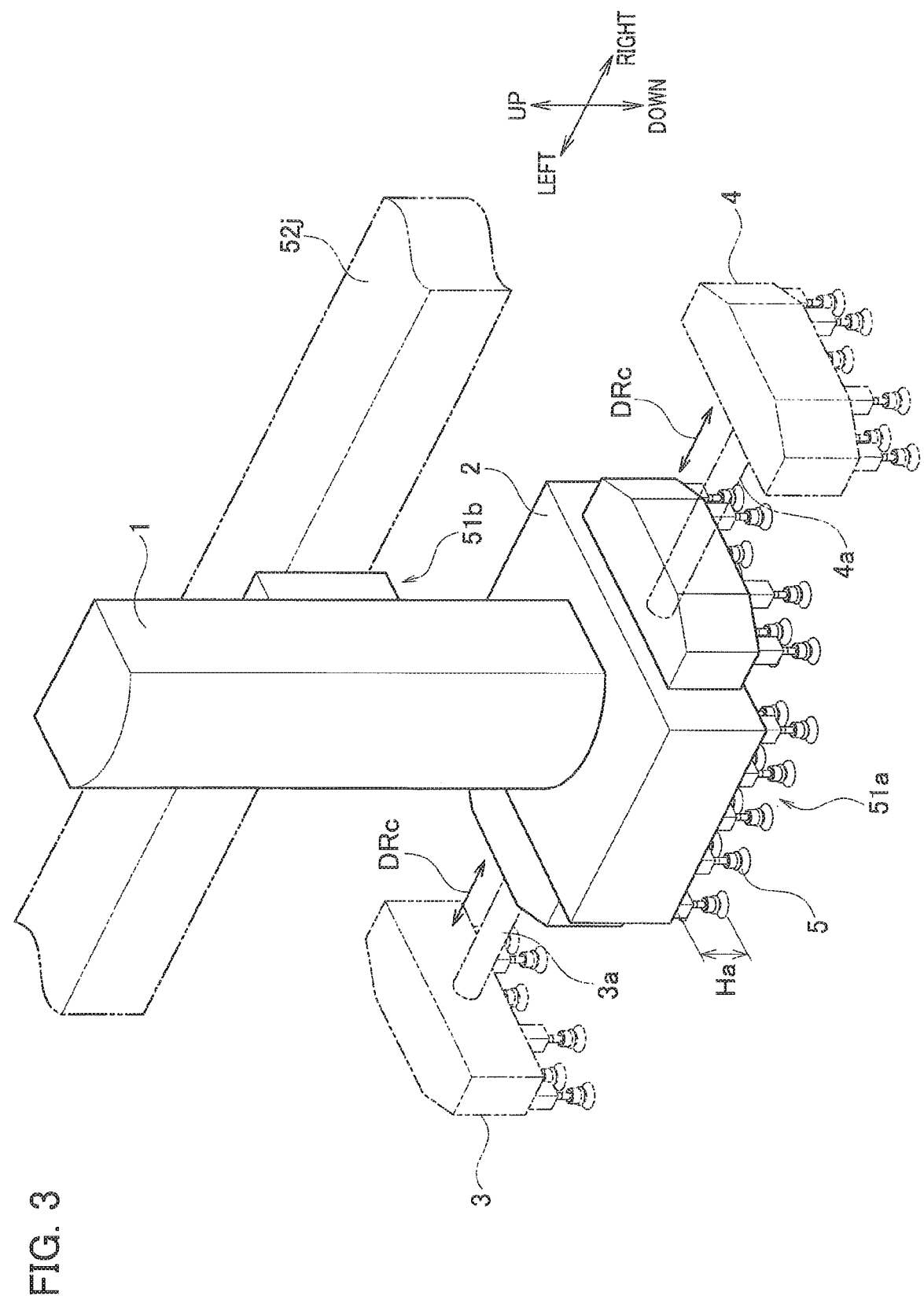
FIG. 3 is a perspective view illustrating the takeout loader 51.

The TK unit 51 will be explained with reference to FIGS. 3 to 7. FIG. 3 is a perspective front view illustrating the TK unit 51 seen from a slightly oblique above right position. The movable frame 52j supporting the TK unit 51 is indicated with a chain line.

The TK unit 51 has an up-down drive part 51b having a servomotor (not illustrated) and supported with the movable frame 52j, a columnar body part 1 moved up and down by a drive source, i.e., the servomotor relative to the up-down drive part 51b and movable frame 52j, and the suction part 51a attached to a lower part of the body part 1.

The suction part 51a has a base part 2 substantially having a hexahedral shape and a pair of auxiliary parts 3 and 4 that are supported with left and right support arm parts 3a and 4a, respectively, and are moved between a base position closely attached to the base part 2 and a left (right) extended position (refer to arrows DRc). In FIG. 3, the auxiliary parts 3 and 4 at the base position are depicted with continuous lines and the auxiliary parts 3 and 4 at the extended position with chain lines.

Figure 4:
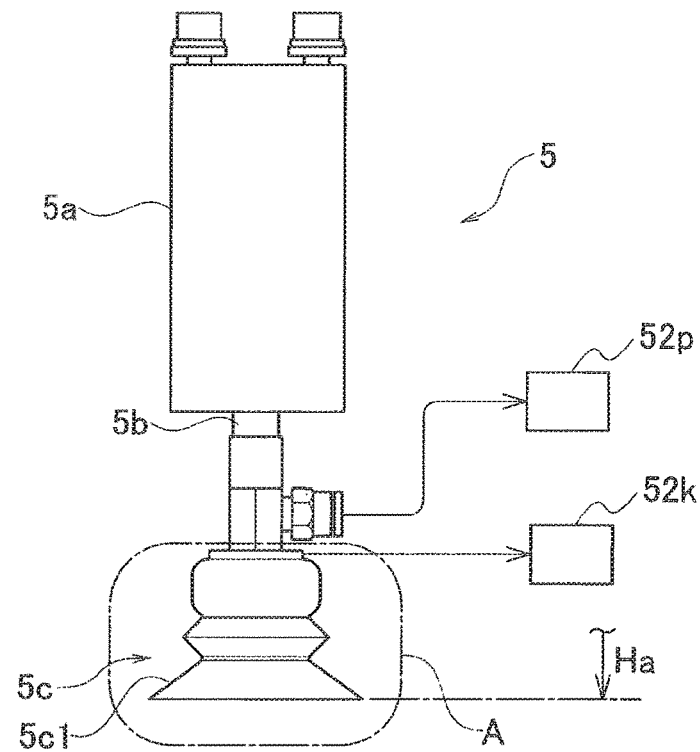
FIG. 4 is a side view illustrating a suction unit 5 provided for the takeout loader 51.

Under the base part 2 and auxiliary parts 3 and 4, there are arranged a plurality of suction units 5 each having an up-down directing axis. FIG. 4 a side view illustrating a single suction unit 5 and FIG. 5 is a partial sectional view illustrating a part A of FIG. 4.

The suction unit 5 has an air cylinder 5*a*, a rod 5*b* driven by the air cylinder 5*a* to extend and retract from a lower part thereof, and a suction pad part 5*c* attached to a front end of the rod 5*b*.

The suction pad part 5*c* is connected to a pump 52*p* (refer also to FIG. 2) to generate a negative pressure inside a rubber suction cup part 5*c*1 arranged at a front end to suck a flat plate member such as the product WP. Operation of the pump 52*p* is controlled by the controller 54.

Figure 5:
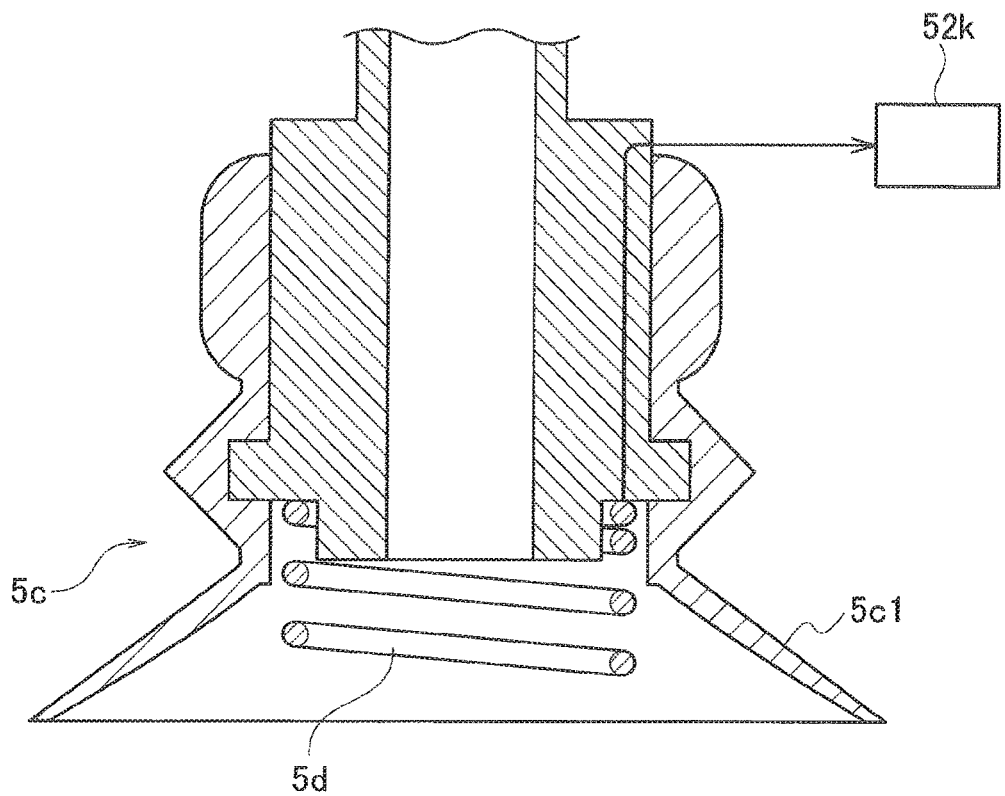
FIG. 5 is a sectional partial view illustrating an internal structure of a suction pad part 5c of the suction unit 5.

As illustrated in FIG. 5, the inside of the suction pad part 5*c* is provided with a coil spring 5*d* that is made of an electrically conductive material and is compressible in the up-don direction. When the suction pad part 5*c* sucks a metal plate, the coil spring 5*d* presses and touches the metal plate and establishes conduction with the metal plate.

The coil springs 5*d* of the plurality of suction pad parts 5*c* are electrically parallel-connected to the floatless switch 52*k* (refer to FIG. 2) and function as contactors to detect conduction.

The floatless switch 52*k* outputs an ON signal if conduction is established between the skid 31*a* and the contactor 5*d* (coil spring 5*d*) and an OFF signal if no conduction is established, to the interference determination part 54*b* of the controller 54.

As illustrated in FIG. 3, the plurality of suction units 5 are arranged so that the height positions of suction faces of the suction pads are aligned at a position downwardly spaced by a predetermined distance Ha from a bottom face of the base part 2. The suction part 51*a* is configured such that, with respect to the product WP, only the contactors 5*d* are conductible and the other parts are insulated.

Figure 6:
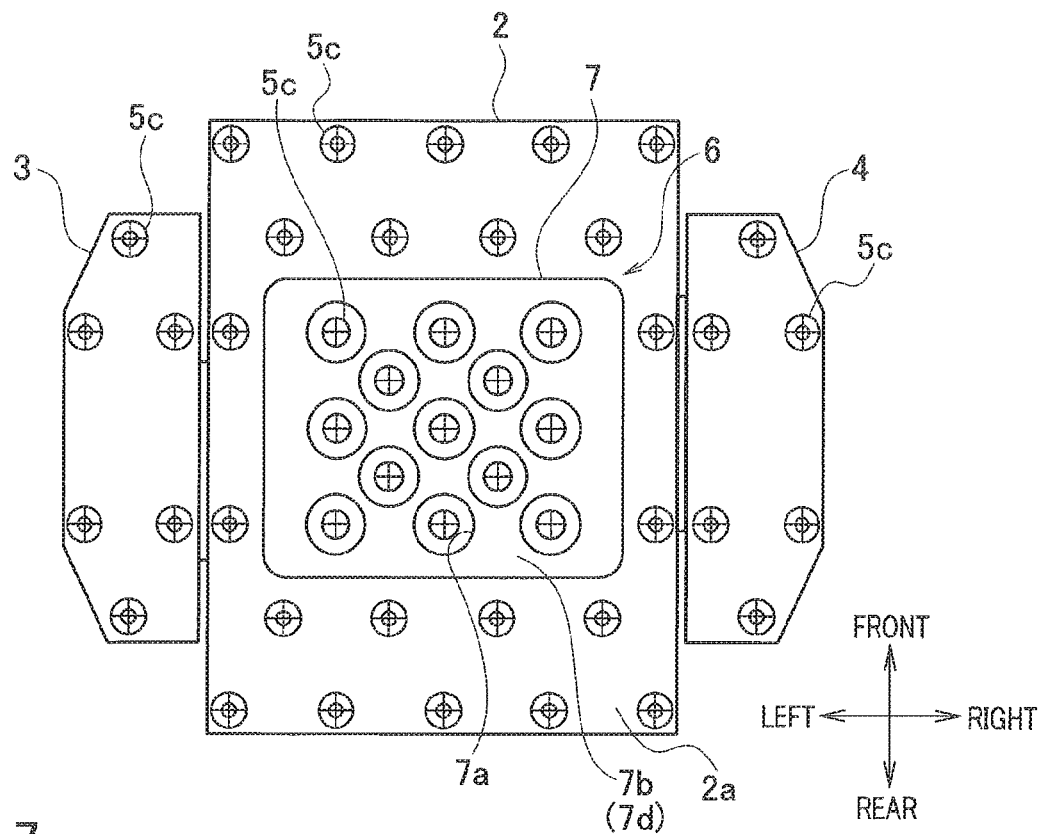
FIG. 6 is a schematic bottom view illustrating the takeout loader 51.
Figure 7:
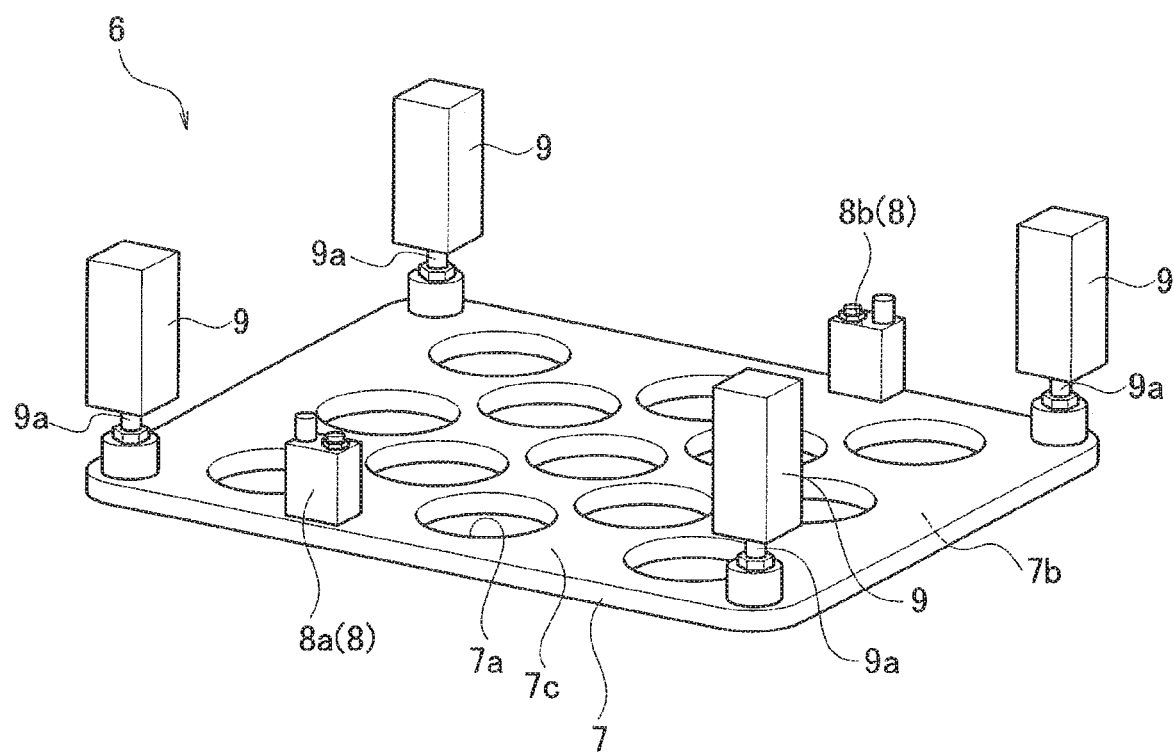
FIG. 7 is a perspective view illustrating a vibration unit 6 provided for the takeout loader 51.

Further, the base part 2 is provided with a vibration unit 6. As illustrated in FIGS. 6 and 7, the vibration unit 6 has a touch plate 7 that is a rectangular resin plate with rounded corners and four up-down cylinders 9 that have rods 9*a*. Front ends of the rods 9*a* are connected to the vicinities of the corners of the touch plate 7 and body base sides thereof are fixed to the base part 2. Also, the vibration unit 6 has, at the vicinities of two opposing side edges of the touch plate 7, two vibrators 8 (8*a* and 8*b*) shifted from each other in the left-right direction. The touch plate 7 is provided with openings 7*a* to pass the suction pad parts 5*c* that are at positions overlapping the touch plate 7.

The plurality of up-down cylinders 9 synchronously conduct in and out operations of the rods 9*a*. Namely, the touch plate 7 keeps a horizontal state when lifted or lowered according to operation of the up-down cylinders 9. This up-down motion is controlled by the controller 54. A lowermost position of the up-down motion of the touch plate 7 is, as mentioned already, a position where a bottom face 7*b* of the touch plate 7 is downwardly away from a bottom face 2*a* of the base part 2 by the predetermined distance Ha.

The touch plate 7 has, at least partly at the bottom face 2*a*, a flat part 7*d* (FIG. 6) as a flat face having a predetermined area. In this example, the bottom face 2*a* is entirely the flat part 7*d*. The touch plate 7 is moved up and down according to operation of the up-down cylinders 9 with the flat part 7*d* keeping a horizontal state.

Each vibrator 8 is an air vibrator that generates vibration with compressed air. More precisely, it is a product also turbine is general-purpose product employing compressed air to turn an impeller provided with an eccentric weight to generate vibration. The vibrators 8 are attached to a top face 7*c* of the touch plate 7 with bolts (not illustrated). Depending on a supplied compressed air pressure (for example, 0.2 to 0.6 MPa), the amplitude and vibration frequency of the vibrators 8 vary with a variable vibration frequency range of about 100 to several hundreds Hz.

Figure 13:
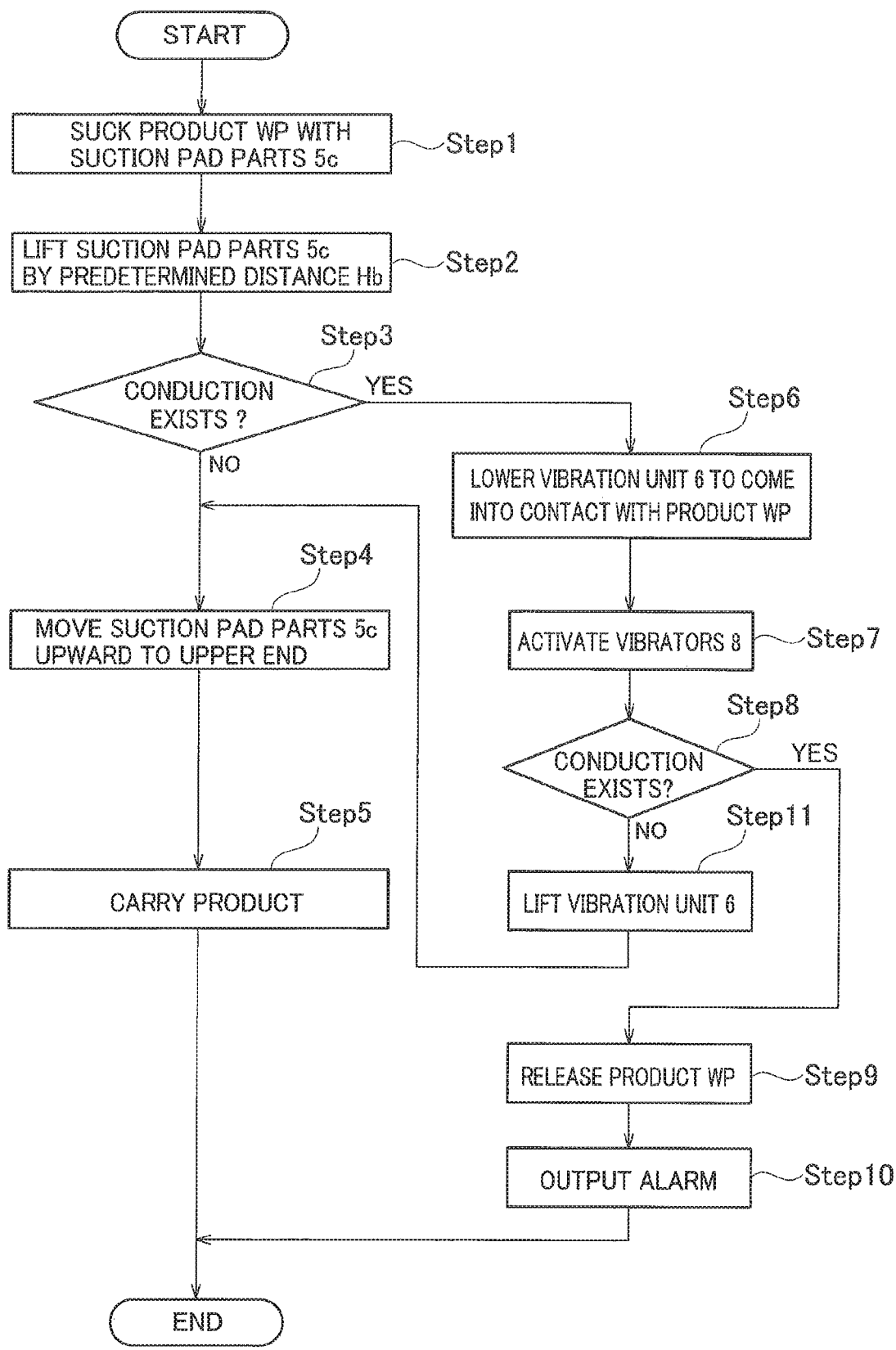
FIG. 13 is a flowchart explaining a sequence of the product taking-out operation by the takeout loader 51.

In the product carrying-out apparatus 52 of the laser processing system ST mentioned in detail in the above, a sequence of taking out the product WP from the skeleton WS will be explained mainly with reference to model views of FIGS. 8 to 12 and a flowchart of FIG. 13. First, with reference to FIGS. 8, 9, and 13, a case that the produce WP is taken out of the skeleton WS without interference will be explained.

FIG. 8 is a front sectional view including the product WP and skeleton WS after the laser processing machine 53 conducts a cutting process to cut the product WP from a workpiece on the skids 31*a*. In FIG. 8, some members such as the suction units 5 are schematically illustrated.

First, after the cutting process is finished, the CPU 54*a* of the controller 54 moves the TK unit 51 to above the product WP, lowers the same, and sucks the product WP with the suction pad parts 5*c* of the suction units 5 (Step 1).

Alter the suction pad parts 5*c* suck the product WP, the TK unit 51 is raised (arrow DRf in FIG. 9) to a predetermined height Hb (for example, about 30 mm) (Step 2).

Figure 9:
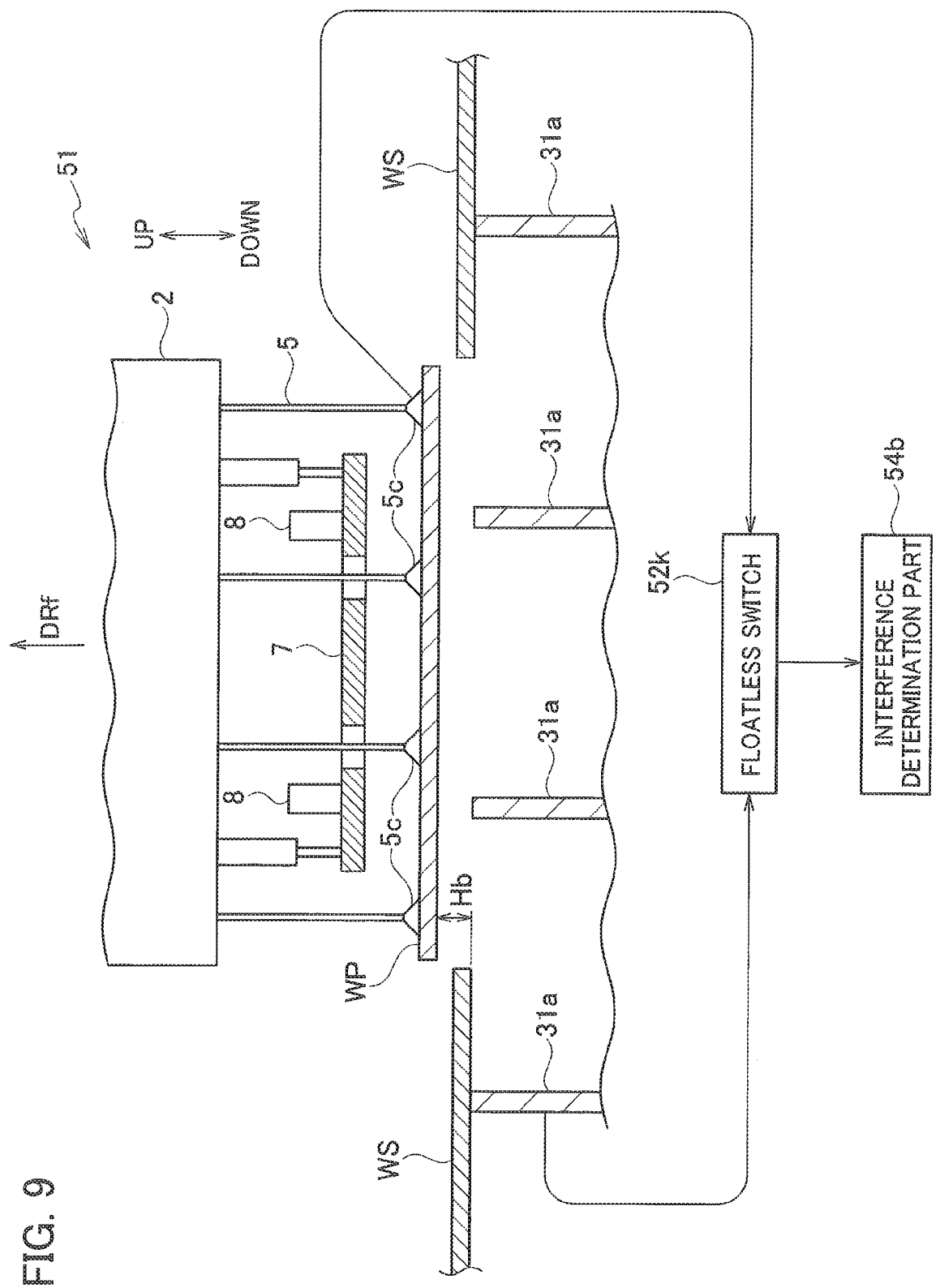
FIG. 9 is a second operational view explaining the product taking-out operation by the takeout loader 51.
Figure 10:
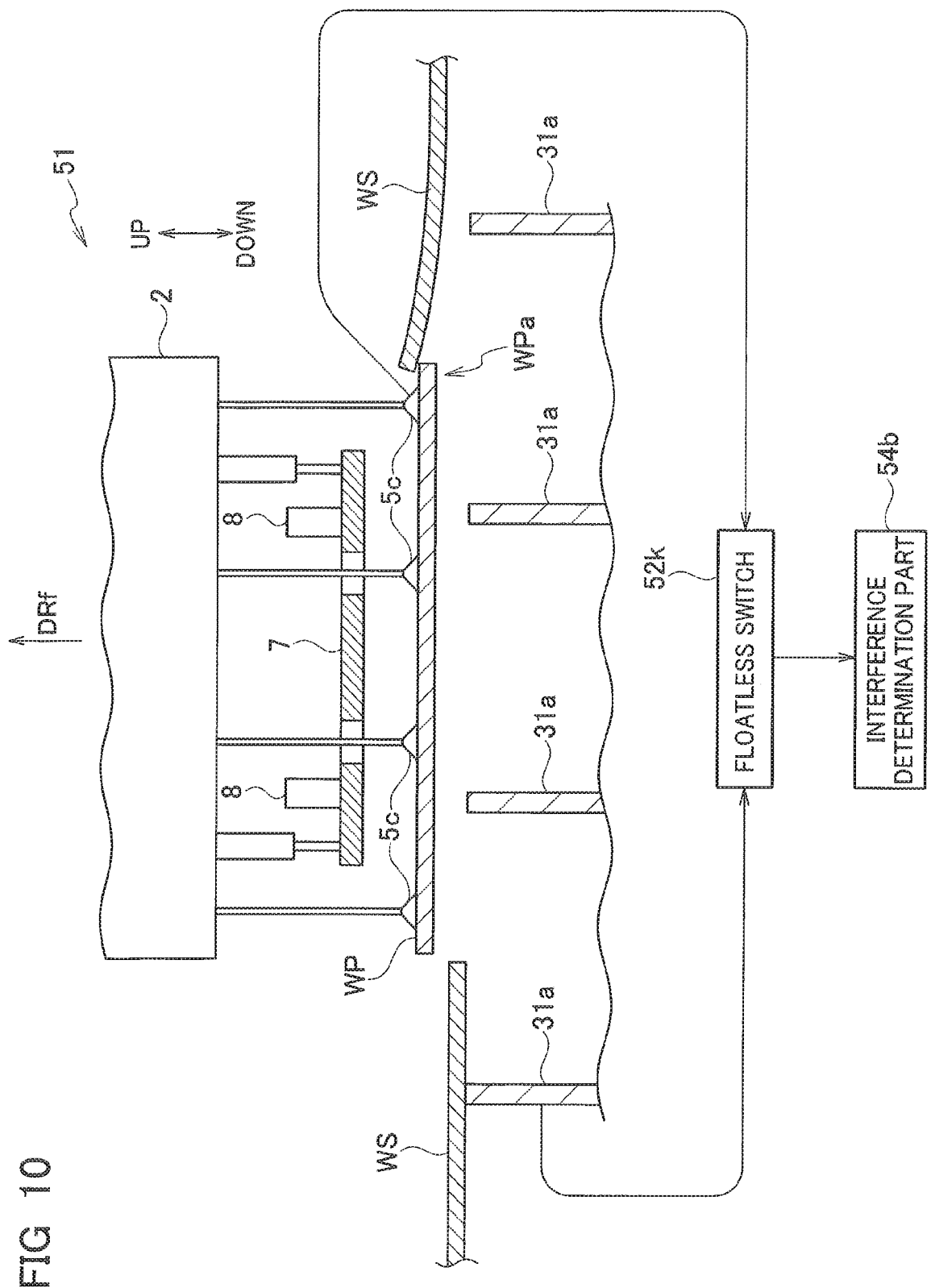
FIG. 10 is a third operational view explaining the product taking-out operation by the takeout loader 51.
Figure 11:
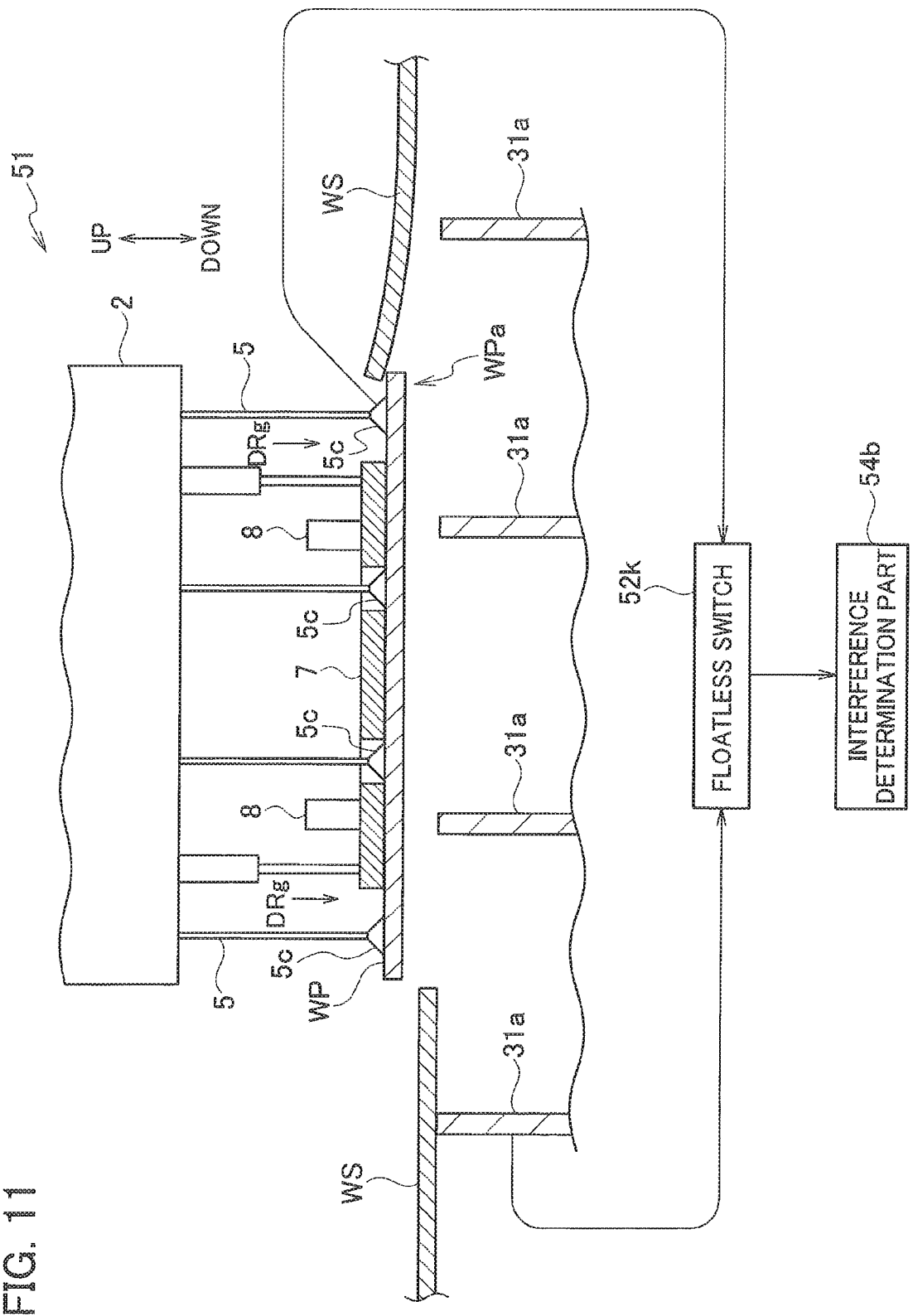
FIG. 11 is a fourth operational view explaining the product taking-out operation by the takeout loader 51.
Figure 12:
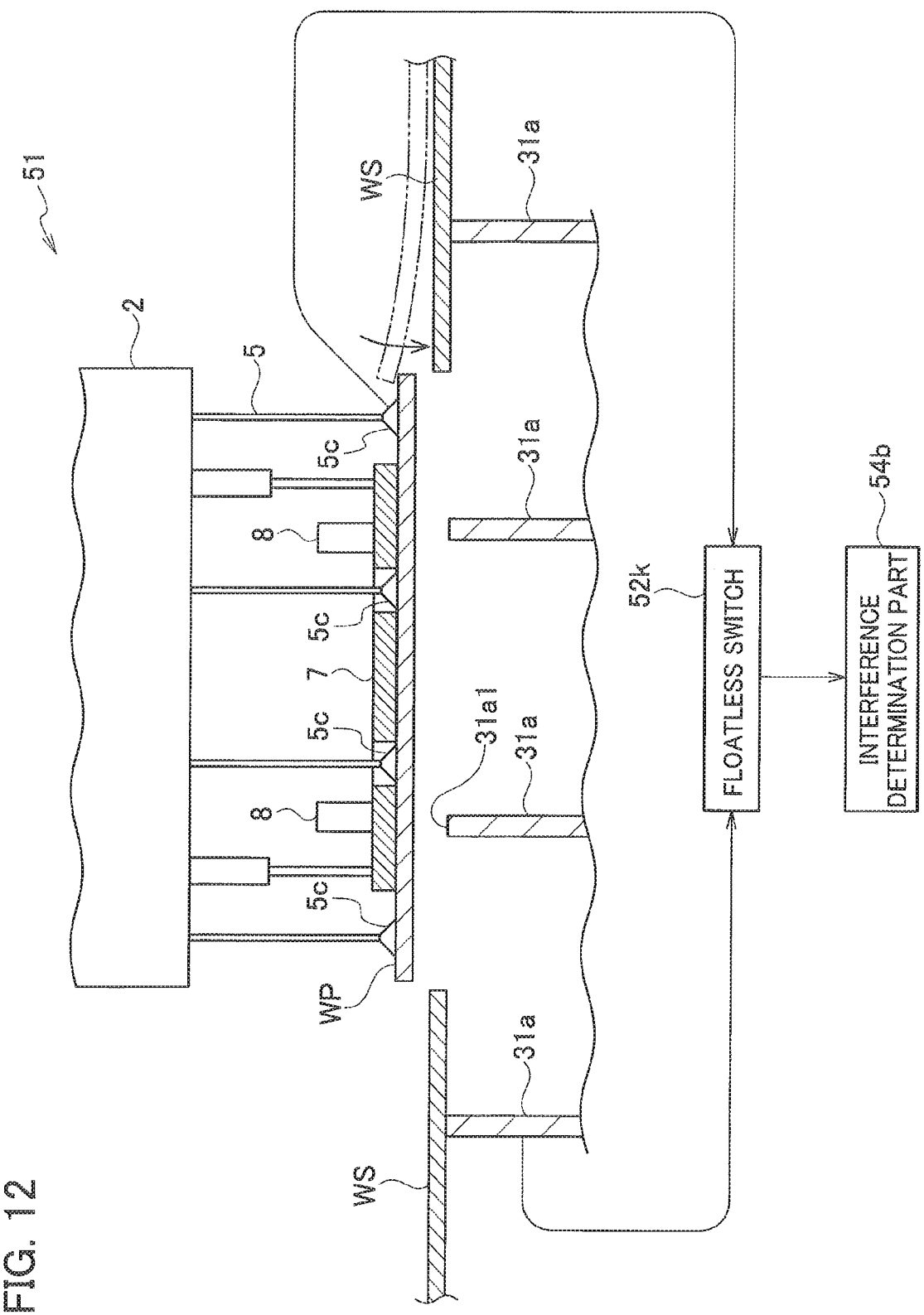
FIG. 12 is a fifth operational view explaining the product taking-out operation by the takeout loader 51.

With this, the product WP is to move upward together with the suction pad parts 5*c*. If there is no interference with the skeleton WS, the product WP separately rises as illustrated in FIG. 9. On the other hand, the skeleton WS causes no rise from the skids 31*a* and is kept placed thereon.

Next, the interference determination part 54*b* of the controller 51 confirms whether an output from the floatless switch 52*k* is ON or OFF.

As illustrated in FIG. 9 and already mentioned, the floatless switch 52*k* is parallel-connected to the plurality of skids 31*a* and suction units 5.

Accordingly, if the product WP and skeleton WS are connected and conducted to each other even at one point, the contactor 5*d* and skid 31*a* become conductive to each other so that the floatless switch 52*k* provides an ON output. On the other hand, when the product WP and skeleton WS are not in contact with each other and no conduction is established between them, the floatless switch 52*k* provides an OFF output. As a result, the interference determination part 54*b* is able to determine conduction/non-conduction according to the ON/OFF output from the floatless switch 52*k* (Step 3).

FIG. 9 illustrates the case that the product WP is lifted without interference or contact with respect to the skeleton WS, and therefore, the output of the floatless switch 52*k* is OFF and the interference determination part 54*b* determines "No conduction" (Step 3: NO).

In response to the "No conduction" determination, the CPU 54*a* acknowledges that there is no interference between the product WP and the skeleton WS and causes the TK unit 51 together with the sucked product WP to be lifted to an uppermost position (Step 4).

Next, the product WP is horizontally moved and then is lowered, thereby carrying and collecting the product WP to and at a transfer destination such as the transfer table 52*b* (Step 5).

Next, a case that the product WP and skeleton WS are in a state to interfere with each other with a region NPa of the product WP being under the skeleton WS when executing the Step 2. In this case, the execution of the Step 2 results in a state illustrated in FIG. 10.

Namely, the skeleton WS is raised in the region WPa of the product WP. In this case, the region WPa is in contact with the skeleton WS, and therefore, the contactors 5*d* in the suction pad parts 5*c* in contact with the product WP are conductive to the skids 31*a* that are in contact with the skeleton WS. As a result, the floatless switch 52*k* provides an ON output and the interference determination part 54*b* determines that there is conduction (Step 3: YES).

In response to the "there is conduction" determination, the vibration control part 54*c* activates the up-down cylinders 9 to lower the vibration unit 6 (arrows DRg in FIG. 11) to make the flat part 7*d* of the touch plate 7 come into contact with a top face WPb of the product WP (Step 6). A predetermined area of the flat part 7*d* of the touch plate 7 is preset to an area that surely comes into contact with a part of the product WP even if the product WP partially has vacant parts such as holes.

Force of the touch plate 7 to downwardly push the product WP is set to be lower than suction force of the suction units 5 applied to the product WP. Accordingly, the contact of the touch plate 7 never releases or drops the product WP from the suction of the suction units 5.

In addition, the touch plate 7 is made of resin, and therefore, never damages the product WP. Naturally, it is possible to employ a hard material such as a metal material for a base material and a soft material such as resin or rubber softer than metal for a part to come into contact with the product WP so as to avoid damages on the product WP.

Contact of the touch plate 7 to the product WP can be grasped according to, for example, an extension quantity of the rod 9*a* of the up-down cylinder 9.

After the flat part 7*d* of the touch plate 7 comes into contact with the product WP, the vibration control part 54*c* activates the vibrators 8 for a predetermined time t1 to apply vibration to the product WP and the skeleton WS that is in contact with the product region WPa (Step 7).

The vibrators 8, i.e., the two vibrators 8*a* and 8*b* apply, as already mentioned, minute-amplitude reciprocating movements generated at, for example, about 100 to several hundreds Hz to the touch plate 7. The predetermined time t1 is preset to, for example, two to three seconds.

After the operation of the vibrators 8*a* and 8*b* for the time t1, the interference determination part 54*b* determines, according to whether the signal from the floatless switch 52*k* is ON or OFF, an existence of conduction between the product WP and the skeleton WS (Step 8).

The product WP receives the minute vibration generated by the vibrators 8*a* and 8*b* and changes a relative position with respect to the skeleton WS. This results in, in many cases, reducing the degree of interference and resolving the interference.

In particular, the operation of the vibrators 8*a* and 8*b* is achieved under the state that the product WP is raised to the predetermined height by the execution of the Step 2, and therefore, the interfering skeleton WS is in such an unstable state that it is only partly lifted by the region WPa.

Applying minute vibration to an unstable object frequently makes the object to shift to a stable state. Due to this, the vibration-applied skeleton WS is to shift from the unstable state partly raised by the region WPa to a stable state entirely supported on the skids 31*a*, so that the interference with the product WP tends to be resolved.

If, in the Step 8, the interference determination part 54*b* determines that there is conduction (YES), the CPU 54*a* acknowledges that the interference is unresolved and a faulty state is occurring and releases the suction of the product WP by the suction pad parts 5*c* to free the product WP (Step 9).

Next, the CPU 54*a* outputs an alarm by voice or image from an output part (not illustrated) (Step 10).

On the other hand, if in the Step 8 the interference determination part 54*b* determines that there is no conduction (NO), the CPU 54*a* acknowledges that the interference between the product WP and the skeleton WS has been resolved and the product WP has been cut off into a satisfactory state and causes the vibration control part 54*c* to lift the vibration unit 6 and separate the touch plate 7 away from the product WP (Step 11). Then, the Step 4 is achieved to execute the product carrying-out operation mentioned above.

If in the Step 8 the interference determination part 54*b* determines that there is conduction, it is possible to return to the Step 7 to again activate the vibrators 8*a* and 8*b* to apply vibration to the product WP and interfering skeleton WS.

Namely, between the Step 8 and the Step 9, a determination step is interposed to determine whether or not the vibration application has reached a predetermined number of times, and if the conduction existing determination continues in the Step 8, the vibration application operation is repeated up to an upper limit number of times.

This may lower a processing efficiency per product for the vibration application time. It, however, may increase the probability of resolving a catch (interference) between the product WP and the skeleton WS. As a result, the number of times of alarm generation will decrease to improve an overall efficiency of processing work. It is preferable to properly set the number of times of vibration application according to interference occurring conditions.

The number of the vibrators 8 arranged on the touch plate 7 may be one, two as mentioned above, three, or more.

If a plurality of vibrators 8 are arranged, it is preferable to randomize their positions as much as possible on the touch plate 7. If there are two vibrators 8*a* and 8*b* as mentioned above, it is preferable to arrange them at left-right directionally shifted positions in the vicinities of front-rear directionally opposing edges of the touch plate 7.

Arranging at least two vibrators 8 results in generating an irregular vibration mode on the touch plate 7, thereby satisfactorily and shortly resolving an overlap, i.e., an interference between the product WP and the skeleton WS.

Also, vibration of the touch plate 7 vibrated by the vibrators 8 is minute, and therefore, an influence on the suction force of the suction pad parts 5*c* acting on the product WP is ignorable.

Further, the vibration by the vibrators 8 causes the touch plate 7 not to move in one direction but to reciprocate with minute displacements so that, in terms of displacement, variations are cancelled to negate the influence on the suction by the suction pad parts 5*c*.

If the laser processing machine 53 is a laser composite processing machine, a hole-opening punching process is sometimes achieved after a product contouring process employing a laser beam, to expand a cut width along the contour so as to avoid an interference between the product WP and the skeleton WS.

In this case, there is a problem of deteriorating an operating efficiency and increasing costs. Employing the above-mentioned product carrying-out apparatus 52 satisfactorily enables the product WP to be separated and lifted from the skeleton WS without conducting the punching process after the laser process. As a result, compared to the case of executing the punching process, an operating efficiency greatly improves and costs are suppressed.

Embodiments of the present invention are not limited to the above-mentioned configurations and sequences, and without departing from the gist of the present invention, modifications are allowed. The shape and size of the touch plate 7 are not limited and may properly be set according to the shape of a product WP. Also, the type of the vibrators 8 is not limited. Not only the above-mentioned air type but also an electric type is employable.

The predetermined lifting height Hb in the Step 2 is preferable to be decreased or increased as the thickness of a workpiece W, i.e., the thickness of a product WP and skeleton WS is increased or decreased.

For example, as the skeleton WS becomes thicker, it becomes undeformable and increases deformation resistance. As a result, when the product WP interfering with the skeleton WS is sucked and lifted, the thicker the plate thickness, the larger the deformation resistance the product WP receives from the skeleton WS, to increase a risk of the product WP dropped from the suction pad parts 5c.

To deal with this, it is preferable that the thicker the plate thickness, the smaller the predetermined height Hb, i.e., a lifting height of the product WP set in the Step 2.

In addition, the larger the product WP, the farther an outer edge position thereof interfering with the skeleton WS is spaced away from the suction part 51a, to increase a resistance moment from the skeleton WS. This is disadvantageous for suction.

To deal with this, it is preferable that the larger the product WP, the smaller the predetermined height Hb set in Step 2, to reduce the resistance moment from the skeleton WS.

The touch plate 7 is not limited to that coming into contact with the top face of the product WP. It may be one that moves upward from the work pallet 31 side and comes into contact with the bottom face of the product WP.

The product WP is not limited to that whose outer shape is cut with a laser beam. It may be one whose outer shape is cut by a thermal cutting device not using a laser beam or by a punching machine.

According to the present invention, there is provided an effect to satisfactorily lift and separate a product from a skeleton.

United States Designation

In connection with United States designation, this international patent application claims the benefit of priority under U.S.C. 119(a) to Japanese Patent Application No. 2017-216316 filed on Nov. 9, 2017 whose disclosed contents are incorporated herein by reference.

The invention claimed is:

1. A product taking-out apparatus, comprising:
a suction part having suction pad parts, wherein the suction part is configured to suck a plate-shaped metal product via the suction pad parts and ascend;
a touch plate configured to move between a separate position and a contact position with respect to the product sucked by the suction part, the touch plate having openings that allow passage of the suction pad parts; and
a vibrator attached to the touch plate and vibrating the touch plate, wherein
the suction pad parts are configured to move relatively to and independent of the touch plate.

2. The product taking-out apparatus as set forth in claim 1, wherein the suction part has a contactor conductive to the sucked product.

3. The product taking-out apparatus as set forth in claim 1, wherein the touch plate has a flat part on a bottom surface thereof.

4. The product taking-out apparatus as set forth in claim 1, wherein the vibrator includes at least two vibrators.

5. A product taking-out apparatus, comprising:
a suction part having suction pad parts, the suction part is configured to suck, via the suction pad parts, a plate-shaped metal product cut out from a workpiece and ascend;
a touch plate configured to move between a separate position and a contact position with respect to the product sucked by the suction part, the touch plate having openings that allow passage of the suction pad parts; and
a vibrator vibrating the touch plate for resolving an interference between the product and a skeleton, wherein
the suction pad parts are configured to move relatively to and independent of the touch plate.

6. A product carrying-out apparatus comprising:
a pallet having a support member supporting a product cut out of a plate-shaped metal workpiece and a skeleton as a remainder;
a suction part sucking the product supported on the support member and ascends;
a touch plate moving between a separate position and a contact position with respect to the product sucked by the suction part;
a vibrator vibrating the touch plate; and
a controller configured to cause the suction part to suck the product supported on the support member and lift the same by a predetermined distance, and thereafter, cause the touch plate to come into contact with the product sucked by the suction part and activate the vibrator for a predetermined time so as to resolve an interference between the product and the skeleton.

7. A product carrying-out apparatus comprising:
a pallet having a support member supporting a product cut out of a plate-shaped metal workpiece and a skeleton as a remainder;
a suction part sucking the product supported on the support member and ascends;
a touch plate moving between a separate position and a contact position with respect to the product sucked by the suction part;
a vibrator vibrating the touch plate; and
a controller configured to cause the suction part to suck the product supported on the support member and lift the same by a predetermined distance, and thereafter, cause the touch plate to come into contact with the product sucked by the suction part and activate the vibrator for a predetermined time, wherein:
the support member is conductive to the supporting skeleton;
the suction part has a contactor conductive to the sucked product; and
the controller controls the operation of the vibrator according to whether or not there is conduction between the support member and the contactor.

8. The product carrying-out apparatus as set forth in claim 6, wherein:
the vibrator is an air vibrator that vibrates at a vibration frequency corresponding to a supplied compressed air pressure; and
the controller changes the pressure during the predetermined time for operating the vibrator.

9. A product taking-out method comprising:
a sucking and lifting action of causing a suction part to suck and lift a product, which is cut out of a metal plate, from a skeleton as a remainder, the product and skeleton being supported on a support member;

a contacting action of causing a touch plate to come into contact with the product sucked by the suction part; and a vibration applying action of causing a vibrator to vibrate the touch plate that is in contact with the product so as to resolve an interference between the product and the skeleton.

10. A product taking-out method comprising:

a sucking and lifting action of causing a suction part to suck and lift a product, which is cut out of a metal plate, from a skeleton as a remainder, the product and skeleton being supported on a support member;

a conduction grasping process of grasping whether or not there is conduction between the contactor and the support member supporting the skeleton, wherein:

a contactor is arranged to be conductive to the product sucked by the suction part; and after causing the suction part to suck and lift the product, there is included, grasping whether or not there is conduction between the contactor and the support member supporting the skeleton, wherein if the conduction grasping process grasps that there is conduction, the touch plate into contact with the product and the touch plate is vibrated by a vibrator.

* * * * *

UNITED STATES PATENT AND TRADEMARK OFFICE
CERTIFICATE OF CORRECTION

Page 1 of 1

PATENT NO. : 11,001,458 B2
APPLICATION NO. : 16/761585
DATED : May 11, 2021
INVENTOR(S) : Yamazaki It is certified that error appears in the above-identified patent and that said Letters Patent is hereby corrected as shown below:

In the Claims

Column 11, Line 22 (Claim 10, Line 16) please change "plate into" to -- plate comes into --

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*